United States Patent Office 3,536,620
Patented Oct. 27, 1970

3,536,620
FIRE-EXTINGUISHING COMPOSITIONS COMPRISING THE REACTION PRODUCTS OF UREA AND A BICARBONATE, CARBONATE OR HYDROXIDE OF SODIUM OR POTASSIUM
James Derek Birchall, Northwich, England, assignor to Imperial Chemical Industries Limited, London, England, a corporation of Great Britain
Filed Oct. 20, 1967, Ser. No. 676,907
Claims priority, application Great Britain, Nov. 3, 1966, 49,366/66; Feb. 7, 1967, 5,837/67
Int. Cl. A62d 1/00; C07c 127/00
U.S. Cl. 252—7
21 Claims

ABSTRACT OF THE DISCLOSURE

Fire-extinguishing compositions are made by heating urea with a bicarbonate, carbonate or hydroxide of sodium or potassium below 150° C. The preferred compositions are made from urea and potassium bicarbonate at a temperature of 110° C. to 120° C. in a ratio of 1.0 mole urea to 0.75 to 1.0 mole potassium bicarbonate, and comprise 75% or more by weight of a compound having the empirical molecular formula $KC_2N_2H_3O_3$, the remainder being substantially $KHCO_3$. The compositions may be mixed with other materials such as free-flowing, anticaking and waterproofing agents and also with materials able to hinder combustion, for example phosphates and borates of ammonium, zinc and alkaline earth metals. The compositions are much superior in fire-extinguishing properties, particularly against liquid fuel fires, to potassium or sodium bicarbonates.

BACKGROUND OF THE INVENTION

Field of the invention

Figure 1:
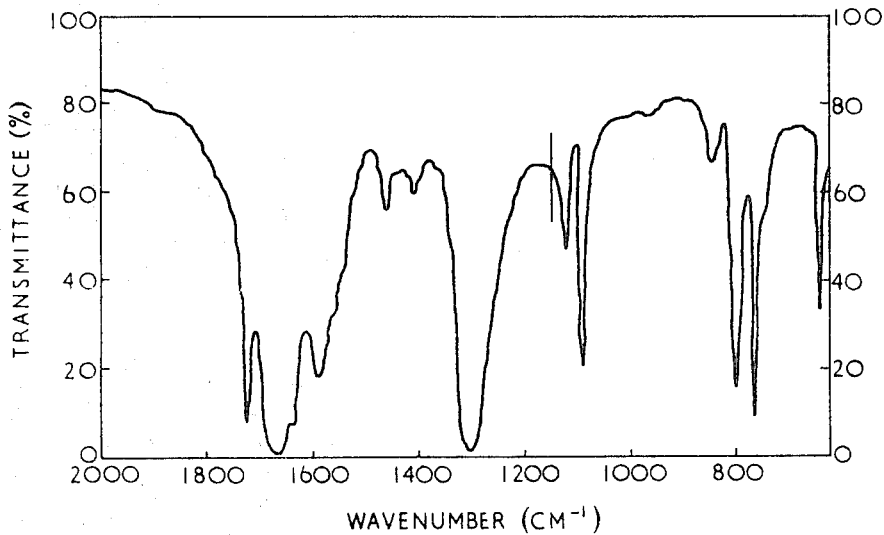

Fire-extinguishing compositions based on powdered materials particularly alkali metal bicarbonates.

Description of prior art

Fire-extinguishing properties of alkali metal bicarbonates and fire-retarding effects of urea are known.

SUMMARY OF THE INVENTION

Process for making fire-extinguishing compositions by heating a mixture of urea and at least one alkali selected from bicarbonates, carbonates and hydroxides of sodium and potassium, preferably potassium bicarbonate in a proportion of 0.75 to 1.0 mole per mole of urea, at a temperature below 150° C. preferably 110° C. to 120° C.

This invention relates to novel compositions of matter having the ability to extinguish flames arising from the combustion of liquid and gaseous fuels such as liquid hydrocarbons, hydrogen, methane and of solid fuels such as wood, paper and textiles. It relates particularly to compositions derived by reactions between urea and bicarbonates, carbonates and hydroxides of sodium and potassium.

In British application No. 34374/65, which corresponds to U.S. Pat. No. 3,484,372 we have described a material for use in extinguishing fires and a process for making it comprising mixing a salt or hydroxide of sodium or of potassium with molten urea and subsequently allowing the melt to cool and solidify and thereafter grinding the solid.

We have now found that under certain conditions reactions take place between urea and bicarbonates, carbonates or hydroxides of sodium or potassium to give novel solid phases that possess powerful fire-extinguishing properties.

The process of the invention in its general form thus provides a method for making compositions of matter possessing fire-extinguishing properties comprising heating a mixture of urea and at least one alkali selected from bicarbonates, carbonates, sesquicarbonates and hydroxides of sodium and potassium at temperatures below 150° C.

The preferred temperature at which the mixture of urea and alkali is heated is from 100° C. to 125° C. and within this range urea and alkali react in the solid state and yield compositions of matter containing 75% and more by weight of novel compounds. Particularly high yields of novel compounds are obtained when the temperature is from 110° C. to 120° C. and the alkali is potassium bicarbonate or sodium bicarbonate.

The results of quantitative analysis of the novel compounds are consistent with an empirical molecular formula for them of $MC_2N_2H_3O_3$, where M represents an atom of potassium or sodium, but precisely how the atoms of the molecule are linked remains to be determined and it is necessary in this specification to define the novel compounds by their empirical molecular formulae,

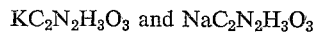

$$KC_2N_2H_3O_3 \text{ and } NaC_2N_2H_3O_3$$

and by infra-red absorption spectra data that are described hereinafter.

The product of the invention in its general form thus comprises compounds having the empirical molecular formula $MC_2N_2H_3O_3$, where M represents an atom of potassium or sodium, and exhibiting characteristic infra-red absorption spectra as hereinafter described. The product of the invention also includes compositions of matter possessing fire-extinguishing properties and comprising the compounds $MC_2N_2H_3O_3$ and being substantially free from urea, that is to say containing less than about 2% by weight of urea. The presence of more than this proportion of urea in any of the compositions may in some circumstances diminish their free-flowing properties. The product of the invention particularly comprises the said compounds $MC_2N_2H_3O_3$ in mixture with alkalis selected from bicarbonates, sesquicarbonates and carbonates of potassium and sodium.

Other materials can if desired be associated with the products of the invention; for example anticaking agents and free-flowing agents such as finely divided silica and other finely divided siliceous materials, calcium hydroxyphosphate, fatty acids and their salts such as stearic acid and calcium stearate; surface-active agents including foaming agents; water-repelling materials such as silicones, and additives to give compatibility with fire-fighting foams. Other materials possessing themselves fire-extinguishing or fire-retarding properties or anti-smouldering properties or similar useful abilities to combat combustion may also be associated with the products of the invention, for example ammonium sulphate, zinc sulphate, phosphates and borates of ammonium, alkali metals, zinc, aluminum and calcium, and in powder form non-inflammable urea/formaldehyde and phenol/formaldehyde condensation products, and non-inflammable halogen-containing compounds, for example chlorinated rubber and chlorinated or brominated paraffin wax.

Whilst the bicarbonates, carbonates and hydroxides of potassium and sodium all react with urea in accordance with the process of the invention the highest yields of novel compounds are given by the bicarbonates, and of the latter potassium bicarbonate gives a higher yield of the potassium compound than sodium bicarbonate does of the corresponding sodium compound. The proportions of urea and alkali in the reaction mixture are conveniently one mole of urea to from 0.5 to 1.5 moles of alkali; the preferred proportions of urea and sodium or potassium bicarbonates are one mole of urea to from 0.75 to 1.0 mole of alkali metal bicarbonate.

The preferred novel compositions of matter having fire-extinguishing properties are those made from urea and potassium or sodium bicarbonates, and they comprise substantially mixtures of the novel compounds hereinbefore described as $MC_2N_2H_3O_3$ and potassium or sodium bicarbonates containing at least 25% and preferably at least 75% by weight of $MC_2N_2H_3O_3$. Particularly preferred are compositions comprising $KC_2N_2H_3O_3$ and potassium bicarbonate. Small amounts of potassium or sodium carbonates may also be present owing to thermal decomposition of the bicarbonate. When sodium or potassium carbonates are used as the alkalis the product is a mixture of $MC_2N_2H_3O_3$ and $M_2CO_3$, where M represents sodium or potassium, and when sodium or potassium hydroxides are used as the alkalis they become carbonated by carbon dioxide from a partial decomposition of the urea and the final product is substantially a mixture of $MC_2N_2H_3O_3$ and $M_2CO_3$.

The novel compounds $MC_2N_2H_3O_3$ can be isolated by heating a mixture of the appropriate alkali with sufficient of an excess of urea to ensure that the reaction product contains some unreacted urea and no alkali, for example by heating a mixture of one mole of urea with not more than 0.5 mole potassium or sodium bicarbonate at 100° C. to 125° C. for three to four hours. After the product has cooled the unreacted urea is removed by solvent extraction, for example with methanol, ethanol or dimethylformamide. The samples of the novel compounds $MC_2N_2H_3O_3$ subjected to infra-red absorption analysis were made in this way.

It is advantageous to compact the mixture of urea and alkali, particularly where the latter is a bicarbonate, before heating since this increases the rate of reaction and hence the yield of novel compounds in a given time. For example the mixture can be formed into ovoids in an indented roll-press.

Figure 2:
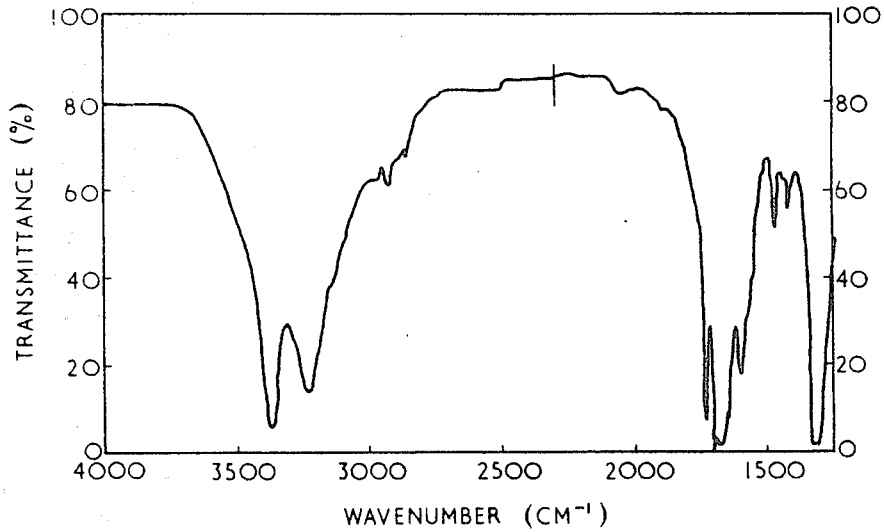

The infra-red absorption spectra of the compound having the empirical molecular formula $KC_2N_2H_3O_3$ were measured using a 1% by weight dispersion in a potassium bromide disc of thickness 0.26 mm. The principal band positions are given in Table I and shown in FIGS. 1 and 2 of the accompanying drawings.

TABLE I

Band positions in reciprocal centimetres

| | |
|---|---|
| 3360 | 1090 |
| 3210 | 842 |
| 1728 | 800 |
| 1665 | 765 |
| 1590 | 640 |
| 1300 | ---- |

Figure 3:
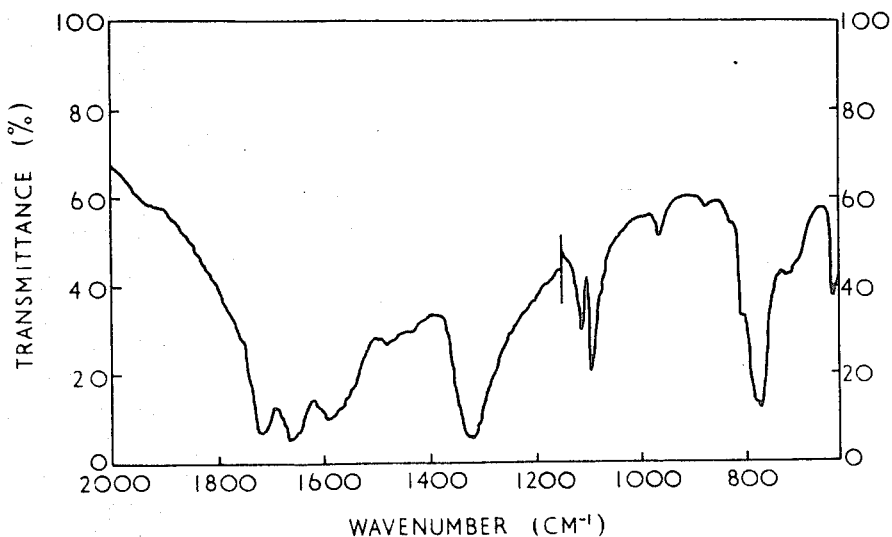
Figure 4:
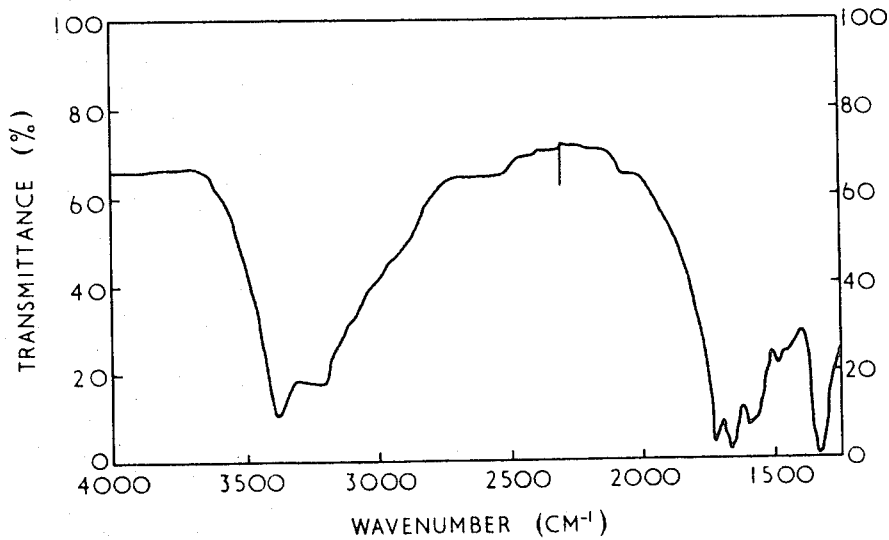

The infra-red absorption spectra of the compound having the empirical molecular formula $NaC_2N_2H_3O_3$ were measured using a 2% by weight dispersion in a potassium bromide disc approximately 0.15 mm. thick. The principal band positions are given in Table II and shown in FIGS. 3 and 4 of the accompanying drawings.

TABLE II

Band positions in reciprocal centimetres

| | |
|---|---|
| 3376 | 1112 |
| 1720 | 1094 |
| 1660 | 968 |
| 1598 | 770 |
| 1330 | 640 |

In the Examples Nos. 1 and 2 illustrate the preparation of compositions of matter according to the invention from urea and potassium bicarbonate, Example 3 illustrates the preparation of the corresponding composition from urea and sodium bicarbonate. Example 4 compares the fire-extinguishing properties of the composition from urea and potassium bicarbonate with those of a proprietary fire-extinguishing powder based on sodium bicarbonate.

EXAMPLE 1

Potassium bicarbonate and urea were separately ground to an average particle size less than 100 microns and mixed in the proportion of 100 kg. bicarbonate to 72 kg. of urea which corresponds to 1 mole of $KHCO_3$ to 1.2 moles $CO(NH_2)_2$. The mixture was then heated in sealed trays in an oven at 115° C. for 7 hours by the end of which time it was in the form of a firm sinter which contained over 95% of the compound having the empirical molecular formula $KC_2N_2H_3O_3$ the remainder consisting substantially of potassium bicarbonate. For evaluation as a fire-extinguishing agent the sinter was lightly crushed to ½ inch size, mixed with 2% calcium hydroxyphosphate and 1% calcium stearate by weight and ground to a median size of 80 microns.

EXAMPLE 2

Potassium bicarbonate and urea were separately ground to an average particle-size less than 100 microns, mixed in the proportion of 1 mole of $KHCO_3$ to 1.2 moles of $CO(NH_2)_2$ and the mixture then compacted into ovoids weighing about 10 g. each and having densities not less than 1.5 g./cm.$^3$, by means of an indented roll-press operating at a roll speed of 3 revolutions per minute and at an inter-roll pressure of 3 tons per inch width of roll. The ovoids were then broken down into approximately ¼ inch pieces and heated at 115° C. for one hour. The product contained over 80% by weight of the compound having the empirical molecular formula $KC_2N_2H_3O_3$, the remainder consisting substantially of potassium bicarbonate.

EXAMPLE 3

Sodium bicarbonate of average particle-size 80 microns was mixed with urea previously ground to an average particle-size less than 100 microns in the proportions of 1 mole of $NaHCO_3$ to 1.2 moles $CO(NH_2)_2$. The mixture was heated at 115° C. for 36 hours after which it was in the form of a sinter which contained about 50% by weight of the compound having the empirical molecular formula $NaC_2N_2H_3O_3$, the remainder consisting substantially of sodium bicarbonate. In another preparation in which the mixture was first compacted in the manner described in Example 2 and then heated a product containing about 60% by weight of the compound was obtained after a somewhat shorter period of heating.

EXAMPLE 4

For any fire-extinguishing agent there is a critical rate of application below which the agent cannot extinguish a fire. Determination of critical rates is thus a suitable method for comparing fire-extinguishing properties. Petrol fires in trays 4 feet by 2½ feet, and 4 feet square and 5 feet square were arranged and the fire-extinguishing agent applied from a standard dry-powder type extinguisher fitted with various nozzles having diameters down to 1/16 inch in order to give various rates of discharge. The results of over 200 experiments showed that for a proprietary brand of powder based on sodium bicarbonate containing anticaking agents the critical rate of application was 0.025 pound per square foot per second, whereas for the composition from urea and potassium bicarbonate prepared for evaluation as described in Example 1 the rate was 0.0025. The particle-diameters determined by air-permeability methods were 8$\mu$ for the sodium bicarbonate and 9$\mu$ for the urea/potassium bicarbonate composition.

What we claim is:

1. A process for making compositions of matter possessing fire-extinguishing properties comprising mixing urea substantially in the solid state with at least one alkali selected from bicarbonates, carbonates, sesquicarbonates and hydroxides of sodium and potassium to give a substantially solid state mixture and heating said mixture at temperatures between 100° C. and 150° C. while maintaining the mixture in the substantially solid state.

2. A process as claimed in claim 1 in which the temperature is from 100° C. to 125° C.

3. A process as claimed in claim 1 in which the mixture of urea and alkali is compacted before being heated.

4. A process as claimed in claim 1 in which the proportion of urea to alkali is one mole of urea to from 0.5 to 1.5 moles of alkali.

5. A process as claimed in claim 1 in which the alkali is potassium bicarbonate.

6. A process as claimed in claim 1 in which the alkali is sodium bicabonate.

7. A process as claimed in claim 6 in which the proportion of urea to alkali is one mole of urea to from 0.75 to 1.0 mole of the bicarbonate.

8. A process as claimed in claim 7 in which one mole of urea is heated with 0.75 to 1.0 mole potassium bicarbonate at 110° to 120° C.

9. Compositions of matter possessing fire-extinguishing properties whenever made by the process of claim 1.

10. Compounds whose empirical molecular formula is $MC_2H_2H_3O_3$, where M represents an atom of potassium or sodium, and which exhibit characteristic infra-red absorption spectra as described in FIGS. 1 to 4 of the accompanying drawings.

11. Compositions of matter possessing fire-extinguishing properties and comprising compounds claimed in claim 10 and being substantially free from urea.

12. Compositions of matter as claimed in claim 11 and comprising (a) at least 25% by weight of compounds whose empirical molecular formula is $MC_2N_2H_3O_3$, where M represents an atom of potassium or sodium, and which exhibits characteristic infra-red absorption spectra as described in FIGS. 1 to 4 of the accompanying drawings and (b) at least one alkali selected from bicarbonates, sesquicarbonates and carbonates of potassium and sodium.

13. Compositions of matter as claimed in claim 12 comprising at least 75% by weight of compounds said.

14. Compositions of matter as claimed in claim 11 comprising the compound whose empirical molecular formula is $KC_2N_2H_3O_3$, and which exhibits a characteristic infra-red absorption spectrum as described in FIGS. 1 and 2 of the accompanying drawings, and potassium bicarbonate.

15. Compositions of matter as claimed in claim 14, when made by mixing the compound whose empirical molecular formula is $KC_2N_2H_3O_3$, and which exhibits a characteristic infra-red absorption spectrum as described in FIGS. 1 and 2 of the accompanying drawings, or a mixture containing it, with additional potassium bicarbonate.

16. Compositions of matter as claimed in claim 14 when made by forming the compound whose empirical molecular formula is $KC_2N_2H_3O_3$, and which exhibits a characteristic infra-red absorption spectrum as described in FIGS. 1 and 2 of the accompanying drawings, in the presence of excess potassium bicarbonate.

17. Compositions of matter as claimed in claim 11 comprising the compound whose empirical molecular formula is $NaC_2N_2H_3O_3$, and which exhibits a characteristic infra-red absorption spectrum as described in FIGS. 3 and 4 of the accompanying drawings, and sodium bicarbonate.

18. Compositions of matter as claimed in claim 17 when made by mixing the compound whose empirical molecular formula is $NaC_2N_2H_3O_3$, and which exhibits a characteristic infra-red absorption spectrum as described in FIGS. 3 and 4 of the accompanying drawings, or a mixture containing it, with additional sodium bicarbonate.

19. Compositions of matter as claimed in claim 17 when made by forming the compound whose empirical molecular formula is $NaC_2N_2H_3O_3$, and which exhibits a characteristic infra-red absorption spectrum as described in FIGS. 3 and 4 of the accompanying drawings, in the presence of excess sodium bicarbonate.

20. Compositions of matter as claimed in claim 11 that also contain at least one material selected from sulphates of ammonium and zinc, and phosphates and borates of ammonium, alkali metals, zinc, aluminium and calcium.

21. Compositions of matter as claimed in claim 11 that also contain at least one additive selected from anticaking agents, free-flowing agents, surface-active agents, water-repelling agents, and substances that give compatibility with fire-fighting foams.

References Cited

UNITED STATES PATENTS

| | | | |
|---|---|---|---|
| 1,823,882 | 9/1931 | Bauer | 252—6 |
| 2,090,592 | 8/1937 | Jacobson | 260—553 |
| 2,212,152 | 8/1940 | Cupery | 260—553 |
| 2,980,505 | 4/1961 | Hass et al. | 260—553 |
| 3,090,749 | 5/1963 | Warnock | 252—2 |

FOREIGN PATENTS 1,118,215  6/1968  Great Britain.

OTHER REFERENCES

Werner, Emil A.: The Chemistry of Urea, London, 1923, pp. 42–45.

JOHN T. GOOLKASIAN, Primary Examiner

D. J. FRITSCH, Assistant Examiner

U.S. Cl. X.R.

252—2; 260—553